United States Patent
Paul

(10) Patent No.: US 10,623,831 B1
(45) Date of Patent: Apr. 14, 2020

(54) STORY ARCHIVE WITHIN A DIGITAL STORY FRAMEWORK

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/425,908

(22) Filed: May 29, 2019

(51) Int. Cl.
| | |
|---|---|
| *H04N 9/80* | (2006.01) |
| *H04N 21/8545* | (2011.01) |
| *H04N 21/472* | (2011.01) |
| *H04N 21/81* | (2011.01) |
| *G06F 3/0485* | (2013.01) |
| *G06F 3/0482* | (2013.01) |
| *G06F 16/11* | (2019.01) |

(52) U.S. Cl.
CPC ....... *H04N 21/8545* (2013.01); *G06F 3/0482* (2013.01); *G06F 3/0485* (2013.01); *G06F 16/113* (2019.01); *H04N 21/47217* (2013.01); *H04N 21/816* (2013.01)

(58) Field of Classification Search
CPC .... G06F 17/24; G06F 17/212; G06F 3/04842; H04L 51/16; G11B 27/031
USPC ........ 386/241, 239, 231, 230, 243, 248, 353
See application file for complete search history.

(56) References Cited

U.S. PATENT DOCUMENTS

| | | | |
|---|---|---|---|
| 8,147,251 B1* | 4/2012 | Anson ................ | G16H 10/60 434/236 |
| 2012/0209815 A1* | 8/2012 | Carson ............... | G11B 27/031 707/661 |
| 2016/0314120 A1* | 10/2016 | Dauderman ......... | G06F 16/951 |

* cited by examiner

*Primary Examiner* — Robert Chevalier
(74) *Attorney, Agent, or Firm* — FisherBroyles, LLP

(57) ABSTRACT

Systems and methods for creating and maintaining digital story progress bars may include (1) creating an archive that stores a user's story-compositions once the story-compositions have been posted to the user's digital story, (2) presenting, within an archive interface, a thumbnail of an archived story-composition being stored in the archive, (3) receiving user input selecting the thumbnail, and (4) in response to receiving the user input, displaying the archived story-composition in a full-story mode. Various other methods, systems, and computer-readable media are also disclosed.

20 Claims, 6 Drawing Sheets

STORY ARCHIVE WITHIN A DIGITAL STORY FRAMEWORK

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
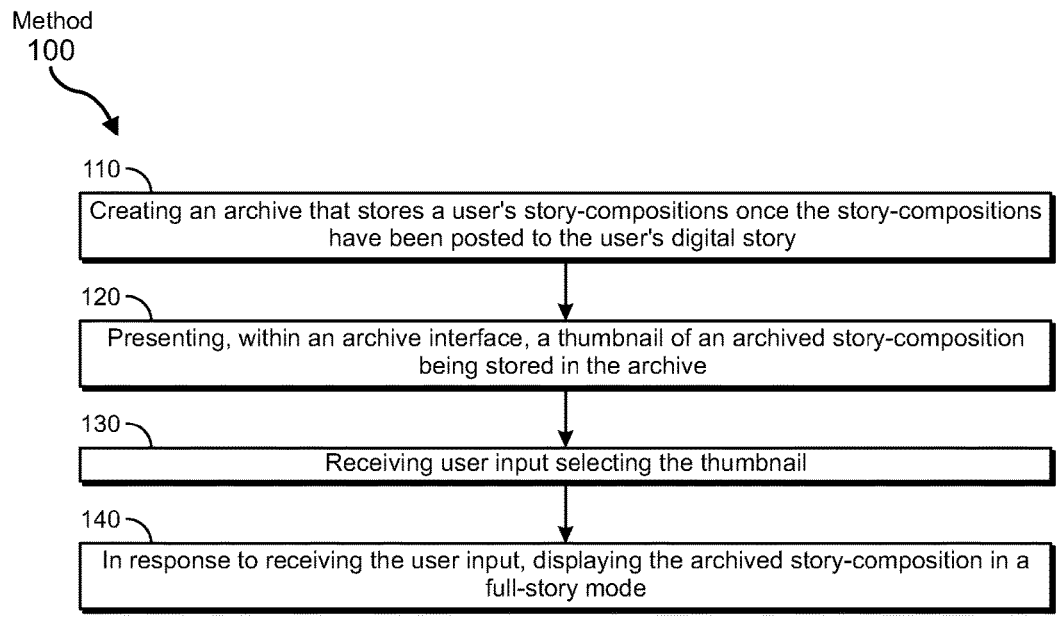
FIG. 1 is a flow diagram of an exemplary method for creating and providing a story archive within a digital story framework.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Social networking platforms allow users to connect socially online. Some platforms may allow users to connect with others by enabling users to create and share digital stories. Each user's digital story may include a set of one or more posts chronicling the user's activities, thoughts, and/or opinions. These posts may be displayed one at a time (e.g., in a slideshow format). Over time, a user's digital story may serve as a valuable personal history for the user in addition to serving as a tool for social connection. As such, the present disclosure focuses on improved systems and methods for organizing a digital story archive that allows users easy persistent access to the content they have posted to their digital stories.

The disclosed story archive system may include different user views (e.g., a montage view and a calendar view). A montage view may include a scrollable list of each day on which a post was added to a user's story. Under each date in the list, a thumbnail of each post added on that date may appear. A calendar view may include a monthly calendar. In response to receiving user input selecting a day within the calendar, the calendar view may display, beneath the calendar, a thumbnail of each post that was added to the user's story on that day. In either view, a user selection of a thumbnail may trigger a full-story mode in which the user's archived posts are displayed in a story slideshow format. The full-story mode may include a progress bar that organizes archived posts by date and/or an interactive time display that organizes posts by time of day.

As will be explained in greater detail below, embodiments of the present disclosure may improve a data-history consumption flow for producers consuming their archived digital stories. The present disclosure may improve the functioning of a computer itself by improving the computer's data organization and data retrieval for archived digital story content.

The following will provide, with reference to FIG. 1, detailed descriptions of computer-implemented methods for creating and providing a digital story archive system. Detailed descriptions of corresponding example systems will also be provided in connection with FIG. 2. In addition, detailed descriptions of corresponding interfaces will be provided in connection with FIGS. 3A-6B.

FIG. 1 is a flow diagram of an exemplary computer-implemented method 100 for creating and providing a digital story archive system. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that performs one or more social networking functions as part of a social networking platform that manages server 202. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 206 of user device 204 may be a member of the social networking platform that manages server 202. In these examples, user device 204 may have installed an instance of a social networking application that operates as part of the social networking platform. Additionally or alternatively, user device 204 may have installed a browser that may navigate to one or more webpages maintained by the social networking platform. The social networking application and/or browser may provide one or more social media interfaces (e.g., a story composition creation interface, a story consumption interface, and/or one or more story-archive interfaces), which may be presented via a display element of user device 204.

Figure 2:
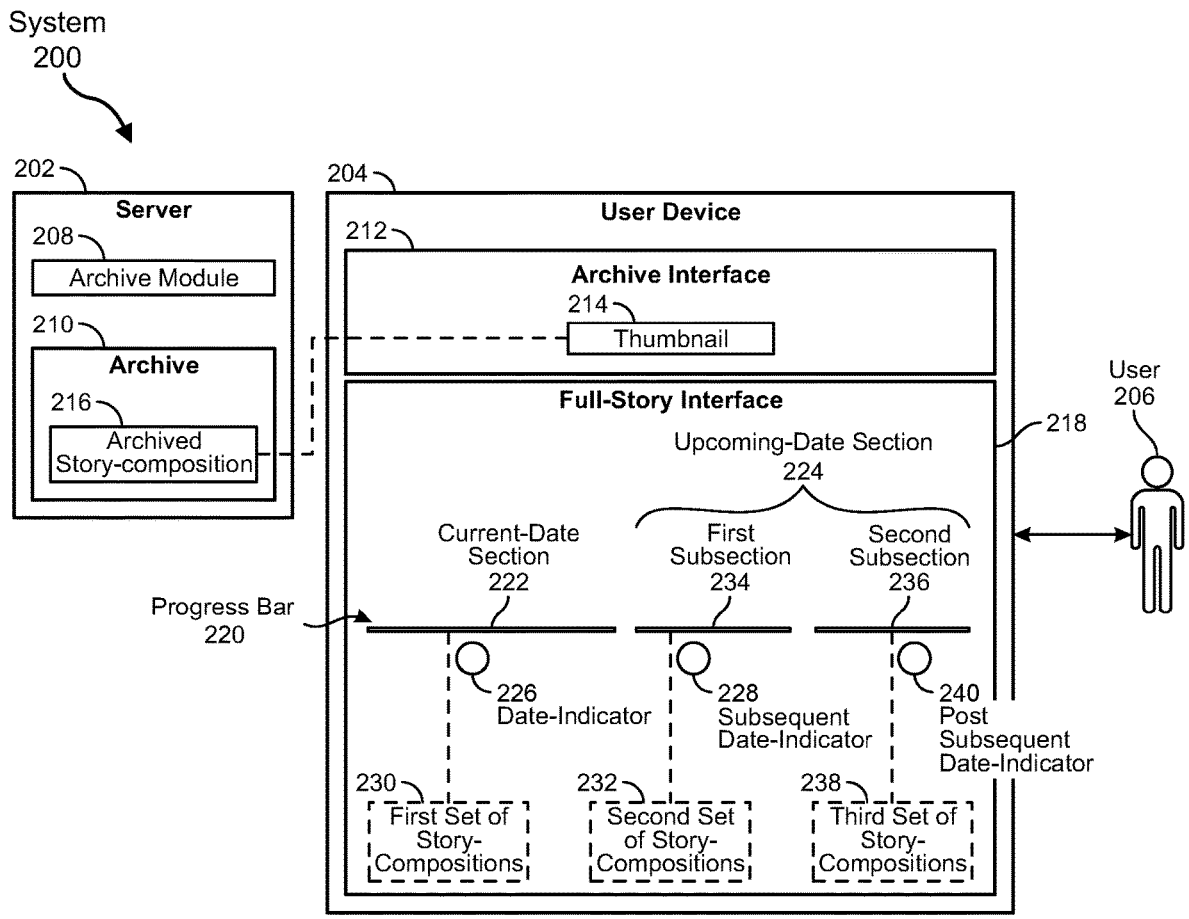
FIG. 2 is a block diagram of an exemplary system for creating and providing a story archive within a digital story framework.
Figure 3:
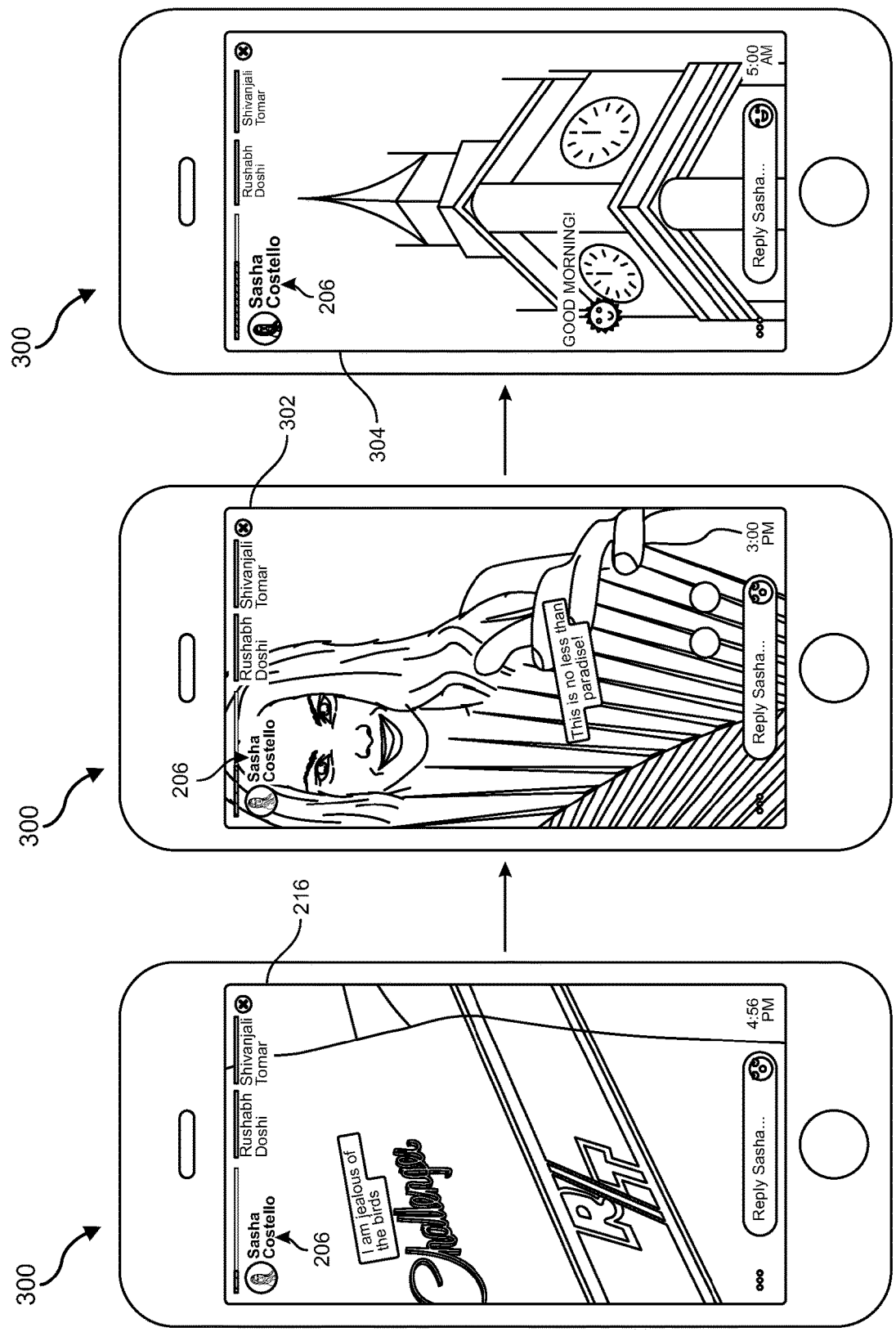
FIGS. 3A-3C are an illustration of an exemplary digital story with three story-compositions.

Returning to FIG. 1, at step 110, one or more of the systems described herein may create an archive that stores a user's story-compositions once the story-compositions have been posted to the user's digital story. For example, as illustrated in FIG. 2, an archive module 208 may create an archive 210 that stores user 206's story-compositions once the story-compositions have been posted to the user's digital story.

The term "digital story" may refer to an ephemeral series of story-compositions created by a particular source (e.g., user) and added to the digital story within a designated time period. The source may designate an audience for the digital story made of one or more users. Once added to the digital story, a story composition may be set to vanish (e.g., to no longer be accessible to the digital story's audience) after a designated length of time has passed. After the designated time period, a post may be inaccessible to the audience via the source's digital story but may continue to be accessible to the source via a digital story archive (such as archive 210).

In a specific example, a source's digital story may include story-compositions created within the last twenty-four hours. In this example, the digital story may be thought of as a single presentation (e.g., video and/or slideshow) of the source's most recent twenty-four hours, which is continuously evolving as the source adds story-compositions to the digital story. FIGS. 3A-3C provide a specific example of a digital story 300 dedicated to user 206 with three digital story-compositions created by user 206: a first story-composition (e.g., archived story-composition 216) added at a first time (4:56 pm), a second story-composition 302 added at a second time (3:00 pm), and a third story-composition 304 added at a third time (5:00 am).

Archive 210 generally represents any type or form of data structure configured to store user 206's digital story-compositions. In some examples, user 206's digital story-compositions may be added to archive 210 once they are posted to user 206's digital story. In these examples, a composition creation module may receive story-compositions from user 206 and may (e.g., in response to receiving user posting-input from user 206) post the story-compositions to user 206's digital story. In addition, archive module 208 may add the story-compositions to archive 210.

In some such examples, archive module 208 may add the story-compositions to archive 210 automatically (e.g., the user posting input may trigger both the posting of the story-compositions and the adding of the story-compositions to archive 210). In other examples, archive module 208 may only add story compositions to archive 210 which user 206 has affirmatively selected to add to archive 210.

Archive 210 may differ from user 206's digital story (that is, from the storage structure that stores the story-compositions posted to user 206's digital story) in several meaningful ways. First, the privacy settings may differ. For example, user 206 may be enabled to configure an audience for each story-composition posted to his or her digital story, such that story-compositions that have been so designated may be accessed, via user 206's digital story, by users within the audience. Archive 210, by contrast, may be designed as a private archive which only user 206 has permission to access. Second, the persistence may differ. For example, story-compositions within the digital story may be ephemeral. That is, the story-compositions may only be accessed (i.e., by those to whom user 206 has granted access rights) for a designated amount of time after being posted (e.g., twenty-four hours). By contrast, story-compositions added to archive 210 may be stored persistently, without an automatic expiration.

Returning to FIG. 1, at step 120, one or more of the systems described herein may present, within an archive interface, a thumbnail of an archived story-composition being stored in the archive. For example, as illustrated in FIG. 2, archive module 208 may present, within an archive interface 212, a thumbnail 214 of archived story composition 216.

Archive interface 212 generally represents any type or form of user interface used to present user 206's archived story compositions. Archive interface 212 may be configured as accessible only to user 206 (e.g., may only be displayed after receiving login credentials associated with an account of user 206). Archive interface 212 may organize the archived story compositions in a variety of ways. In some examples, archive interface 212 may toggle between displaying content using at least two different views, each of which may organize the archived story compositions in a distinct way: e.g., a calendar view and a montage view.

Figure 4:
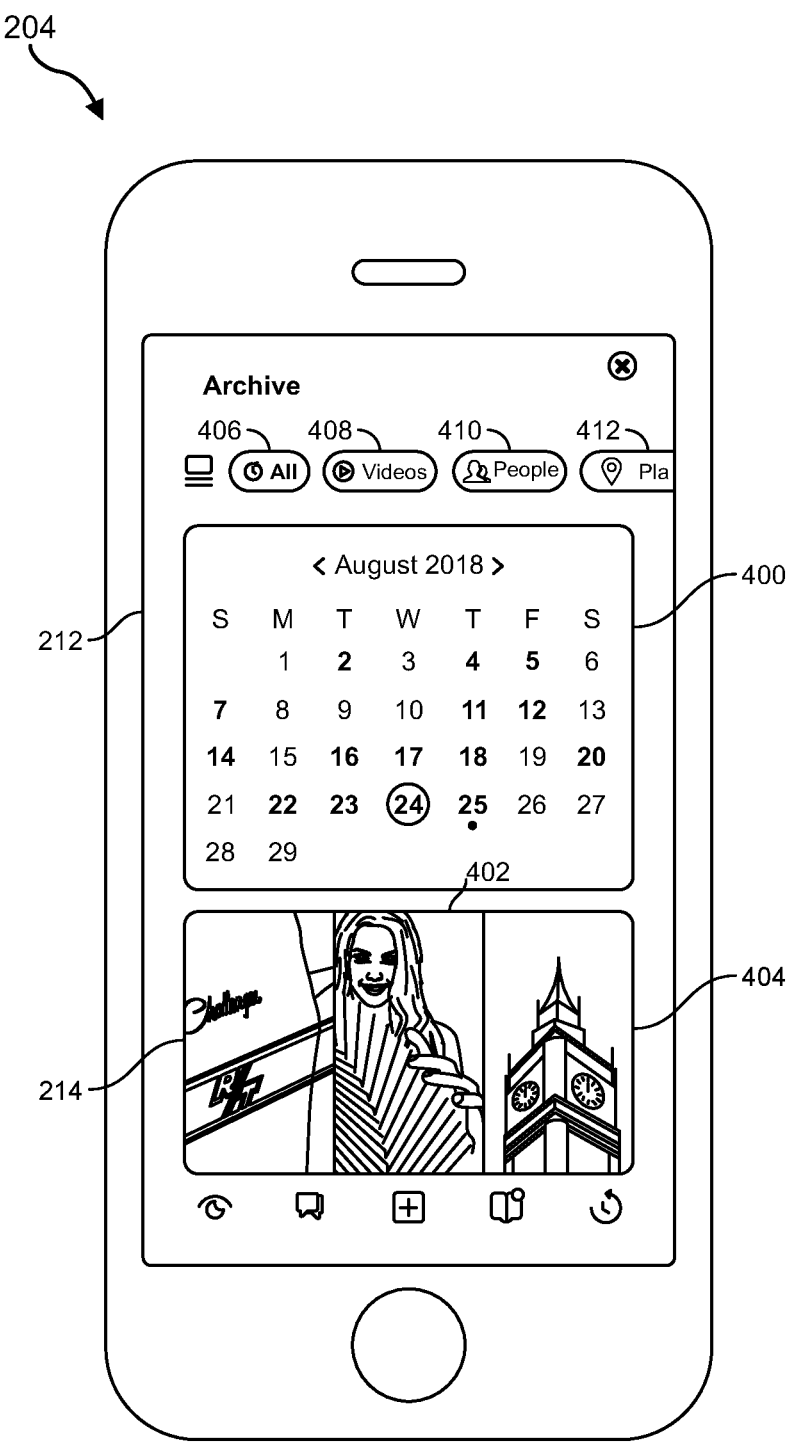
FIG. 4 is an illustration of an exemplary calendar view of an archive interface.

FIG. 4 provides an exemplary embodiment of a calendar view of archive interface 212. As illustrated in FIG. 4, in the calendar view, archive interface 212 may be configured to present a digital calendar (e.g., digital calendar 400 in FIG. 4).

When archive interface 212 is being displayed in a calendar view, archive interface 212 may present a thumbnail of each archived story-composition posted to user 206's digital story on a particular date in response to archive module 208 receiving user input selecting the particular date with the digital calendar. Using FIG. 4 as a specific example, archive module 208 may receive user input selecting the date "Aug. 24, 2018." In response, archive interface 212 may present a thumbnail of each story-composition that was added to user 206's digital story on Aug. 24, 2018: thumbnail 214 of a first story-composition added to user 206's digital story on Aug. 24, 2018 (i.e., archived story-composition 216), a thumbnail 402 of a second story-composition added to user 206's digital story on Aug. 24, 2018, and a thumbnail 404 of a third story-composition added to user 206's digital story on Aug. 24, 2018.

Figure 5:
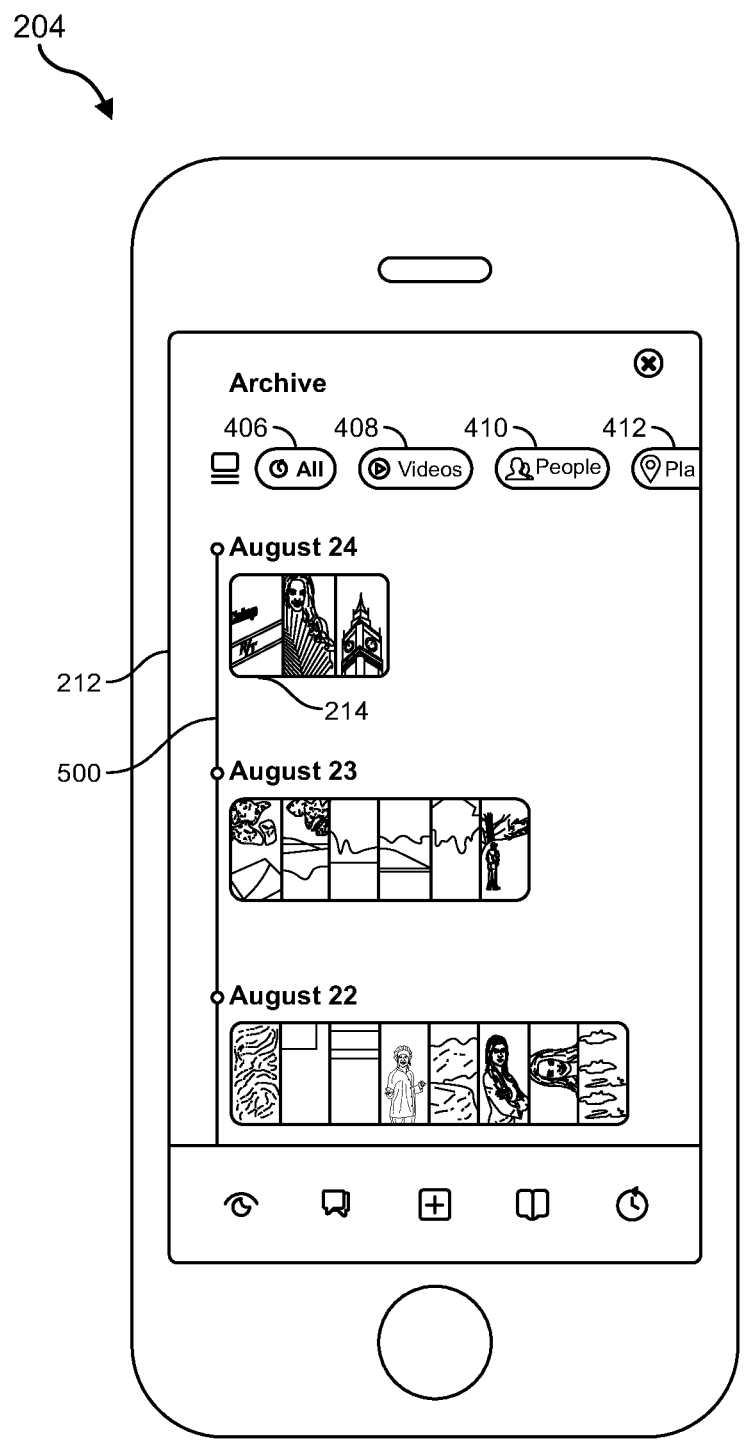
FIG. 5 is an illustration of an exemplary montage view of an archive interface.

FIG. 5 provides an exemplary embodiment of the montage view of archive interface 212. In the montage view, archive module 208 may present a scrollable list of each date on which a story-composition was added to user 206's digital story. For example, as shown in FIG. 5, archive module 208 may present a scrollable list 500, which may include the dates August 22, August 23, and August 24. Scrollable list 500 may also include additional dates, which may come into view in response to receiving user scrolling input.

In examples in which archive interface 212 is being displayed in a montage view, archive module 208 may present thumbnail 214 within archive interface 212's scrollable list. Returning to the specific example of FIG. 5, archive module 208 may present thumbnail 214 within scrollable list 500 beneath the date "August 24."

In some examples, archive module 208 may cull which archived story-compositions are represented with a thumbnail within archive interface 212 based on composition type, in response to receiving user input. For example, as illustrated in FIGS. 4 and 5, archive interface 212 may include various selectable type-elements: e.g., an all element 406, associated with all story-compositions, a videos element 408, associated with only video-based story-compositions, a people element 410, associated with only story-compositions that are associated with designated users (e.g., in which designated users are tagged, are audience members, and/or are co-authors), and a places element 412, associated with only story-compositions that are associated with a designated location. In this example, archive module 208 may receive user input selecting one or more of the selectable type-elements and may adjust archive interface 212 to only display the thumbnails of story-compositions corresponding to the selected types. In one such example, a selection to display the thumbnails of story-compositions of all types may be a default selection.

Returning to FIG. 1, at step 130, one or more of the systems described herein may receive user input selecting the thumbnail. For example, as illustrated in FIG. 2, archive module 208 may receive user input from user 206 selecting thumbnail 214. Archive module 208 may receive the user input in a variety of ways, including, without limitation, receiving a tap to a portion of a touchscreen of user device 204 corresponding to thumbnail 214 and/or input to an auxiliary device while a cursor element is in a spatial location corresponding to thumbnail 214.

In response to receiving the user input, one or more of the systems described herein may display the archived story-composition in a full-story mode (step 140). For example, as illustrated in FIG. 2, archive module 208 may display archived story-composition 216 in a full-story mode. Archive module 208 may implement the full-story mode in a variety of ways. In one embodiment, archive module 208 may implement the full-story mode by displaying a full-screen view of archived story-composition 216 within a full-story interface 218.

In some examples, full-story interface 218 may additionally include a progress bar 220. FIG. 5 provides an illustration of an exemplary depiction of progress bar 220 within full-story interface 218. Progress bar 220 may include (1) a current-date section 222, associated with a date on which archived story-composition 216 was posted to user 206's digital story, and (2) an upcoming-date section 224, associated with the earliest subsequent date on which a subsequent archived story-composition was added to user 206's digital story. Current-date section 222 may be marked with a date-indicator 226, which indicates the date on which archived story-composition 216 was posted to user 206's digital story. Upcoming-date section 224 may be marked with a subsequent date-indicator 228, which indicates the earliest subsequent date.

Progress bar 220 may generally represent any type or form of graphical line, positioned within a full-story archive interface, that depicts progress within the archived story-compositions of a user's digital story. Progress bar 220 may take of a variety of forms. In some examples, as illustrated in FIG. 2, progress bar 220 may take the form of a rectangular line. In other examples, progress bar 220 may take the form of a graphical wave. Progress bar 220 may be positioned within full-story interface 218 at any orientation. For example, progress bar 220 may represent a horizontally oriented bar (as shown in FIG. 2), a vertically oriented bar, a canted bar, etc.

As mentioned above, progress bar 220 may include two sections: current-date section 222 and upcoming-date section 224. In some examples, progress bar 220 may be evenly divided between both sections with current-date section 222 running the length of the first half of progress bar 220 and upcoming-date section 224 running the length of the second half of progress bar 220. In other examples, a greater portion of progress bar 220 may be allocated to one of the two sections. Each of the sections may perform a functionality, which will each be described, in turn.

First, current-date section 222 may be dedicated to providing information relating to a set of story-compositions currently being displayed within full-story interface 218. In FIG. 2, the set of story-compositions currently being displayed may correspond to a first set of story-compositions 230 posted to user 206's digital story on the date on which archived story-composition 216 was posted to user 206's digital story (e.g., a set that may include story-compositions 216, 302, and 304 depicted in FIG. 3).

In some examples, current-date section 222 may be configured to visually convey an amount of progression through first set of story-compositions 230. For example, a portion of current-date section 222 that is filled (e.g., bolded) may correspond to a percentage and/or number of story-compositions within first set of story-compositions 230 that have displayed relative to a percentage and/or number of story-compositions within first set of story compositions 230 that are still in queue to be displayed. Additionally or alternatively, a portion of current-date section 222 that is filled (e.g., bolded) may correspond to an amount or percentage of time that is left before first set of story-compositions 230 finishes displaying. Thus, current-date section 222 may provide user 206 with an indication of how much he or she has seen of his or her digital story from a date currently being displayed, and how much remains to be seen.

In some examples current-date section 222 may represent a single unbroken bar that may be filled at a continual speed as story-compositions within first set of story-compositions 230 are displayed (e.g., instead of current-date section 222 being broken into a series of discrete sections, each of which corresponds to a different story-composition within the set of story-compositions).

Next, upcoming-date section 224 may be dedicated to providing information relating to a second set of story-compositions 232 posted on an earliest subsequent date on which a subsequent archived story-composition was added to user 206's digital story. For example, in one embodiment, first set of story-compositions 230 may have been added to user 206's digital story on Aug. 24, 2018 and the next earliest date on which user 206 may have added to his or her digital story may have been on Aug. 25, 2018. In this embodiment, second set of story-compositions 232 may represent a set of story-compositions that were added to user 206's digital story on Aug. 25, 2018 (i.e., the earliest subsequent date after Aug. 24, 2108).

In some examples (not illustrated), upcoming-date section 224 may be dedicated to a single subsequent date (i.e. the earliest subsequent date following the date on which archived story-composition 216 was posted). In other examples, upcoming-date section 224 may provide information related to multiple subsequent dates. In these examples, upcoming-date section 224 may include various subsections, each of which may be dedicated to a different subsequent date. FIG. 2 illustrates an embodiment in which upcoming-date section 224 includes two subsections: a first subsection 234, corresponding to second set of story-compositions 232 posted on the earliest subsequent date, and a second subsection 236, corresponding to a third set of story-compositions 238 posted on a next earliest subsequent date.

In some examples, as mentioned previously, upcoming-date section 224 may include one or more date-indicators. In examples in which upcoming-date section 224 includes multiple subsections, each subsection may include its own date-indicator. In FIG. 2, first subsection 234 may include subsequent date-indicator 228, which indicates the date on which second set of story-compositions 232 were posted to user 206's digital story and second subsection 236 may include post subsequent date-indicator 240, which indicates the date on which third set of story-compositions 238 were posted to user 206's digital story. In some embodiments, which will be discussed in greater detail below, upcoming-date section 224 may additionally be used to navigate (e.g., skip ahead) to story-compositions associated with an upcoming date.

In embodiments in which first set of story-compositions 230 includes multiple posts, archive module 208 may transition from displaying a current post of first set of story-compositions 230 (i.e., a post currently being displayed) to the next post in response to a variety of triggers. In one example, archive module 208 may transition from one post to the next automatically (i.e., after a current post has displayed for the predetermined length of time). Additionally, archive module 208 may transition from one post to the next in response to receiving user input (e.g., user scrolling input and/or user tapping input to a touchscreen of user device 204).

Archive module 208 may order the posts within first set of story-compositions 230 for display in a variety of ways. In one example, archive module 208 may display the posts in an ascending chronological order, with posts added at an earlier time displayed prior to posts added at a later time. In an alternate example, archive module 208 may display the posts in a descending chronological order, in which more recently added posts are displayed prior to older posts. In additional or alternative examples, the posts may be organized based on a time associated with content within a post (e.g., a time at which a digital picture was taken, a time at which a website being linked to was created, etc.).

In addition to transitioning between displaying the various posts within first set of story-compositions 230, archive module 208 may transition from displaying the posts within first set of story-compositions 230 to displaying posts within a subsequent set of story-compositions (e.g., second set of story-compositions 232 and/or third set of story-compositions 238). Archive module 208 may transition to displaying the posts of the subsequent set of story-compositions in response to a variety of triggers. In some examples, the transition may be automatic. For example, archive module 208 may automatically transition from displaying the posts within first set of story-compositions 230 to displaying the posts within second set of story-compositions 232 after the final post within first set of story-compositions 230 has displayed.

In other examples, archive module 208 may transition to displaying the posts of a subsequent set of story-compositions in response to receiving user input. In one such example, upcoming-date section 224 (and/or each subsection within upcoming-date section 224) may be selectable. In this example, prior to displaying at least one of the posts within first set of story-compositions 230, archive module 208 may (1) receive user input selecting upcoming-date section 224 and/or a subsection of upcoming-date section 224 and (2) display the posts corresponding to the selected section and/or subsection in response.

Archive module 208 may signal the transition from displaying the posts within first set of story-compositions 230 to displaying the posts of a subsequent set of story-compositions in a variety of ways. In some examples, archive module 208 may signal the transition by sliding each date-indicator out of view or to a new position (e.g., as a post from the subsequent set of story-compositions slides into view).

Figure 6A:
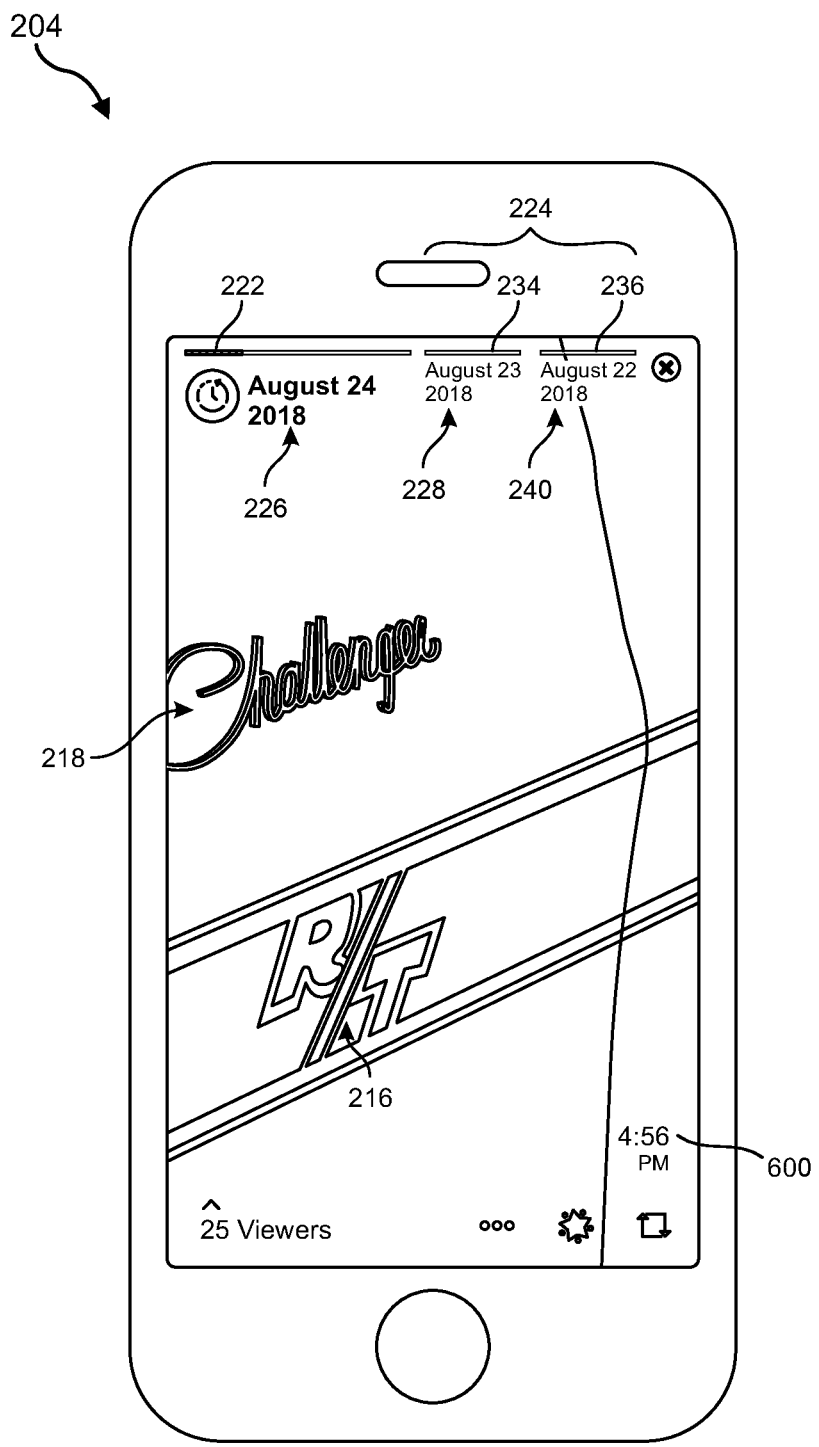
FIGS. 6A-6B are illustrations of interfaces within an exemplary full-story view of a story archive.
Figure 6B:
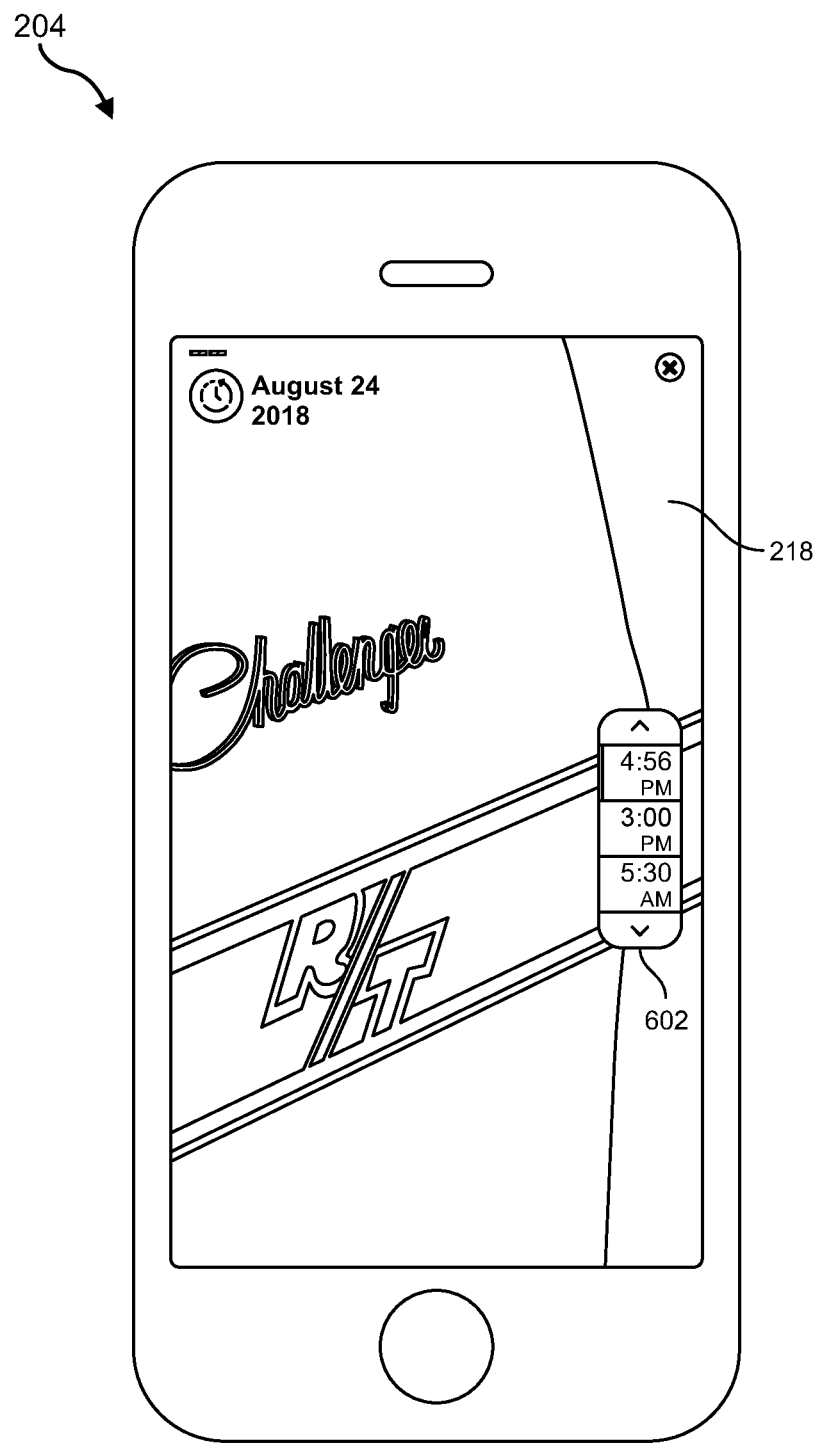

Using FIG. 2 and/or FIG. 6A as a specific example in which archive module 208 transitions to displaying posts within second set of story-compositions 232, archive module 208 may slide each date-indicator to the left such that date-indicator 226 slides out of view, subsequent date-indicator 228 slides into the position previously taken by date-indicator 226, post subsequent date-indicator 240 slides into the position previously taken by subsequent date-indicator 228, and a new date-indicator (corresponding to a story-composition within a fourth set of story-compositions in queue to be displayed after the posts within third set of story-compositions 238) slides into the position previously taken by post subsequent date-indicator 240.

In another specific example, in which archive module 208 transitions to displaying posts within third set of story-compositions 238, archive module 208 may slide each date-indicator to the left such that date-indicator 226 and subsequent date-indicator 228 slide out of view, post subsequent date-indicator 240 slides into the position previously taken by date indicator 226, the new date-indicator slides into the position previously taken by subsequent date-indicator 228, and an additional new date-indicator (corresponding to a story-composition within a fifth set of story-compositions in queue to be displayed after the posts within the fourth set of story-compositions) slides into the position previously taken by post subsequent date-indicator 240.

In some embodiments, archive module 208 may additionally signal the transition with a temporary pause, a temporary resistance to user input (e.g., scrolling input), a temporary application of a filter over the face of full-story interface 218 (e.g., a translucent color that covers the face of full-story interface 218), a temporary change in a background of full-story interface 218, and/or a temporary change in a size of one or more elements displayed within full-story interface 218.

In some examples, full-story interface 218 may include various additional elements, in addition or as an alternative to progress bar 220. The additional elements may be configured to emphasize time as a unifying theme within user 206's digital story. For example, full-story interface 218 may include a stationary time graphic (e.g., a graphic of a split-flap time display). In this example, a time displayed by the stationary time graphic may change each time full-story interface 218 transitions to displaying a different post within a digital story associated with a particular date. Using FIG. 6A as a specific example, a stationary graphic 600 may indicate the time "4:56 PM," a time corresponding to the first post within first set of story-compositions 230 (i.e., archived story composition 216), while the first post is being displayed within full-story interface 218.

In one embodiment, full-story interface 218 may include an interactive time display of selectable time entries. Using FIG. 6B as a specific example, an interactive time display 602 may be positioned within full-story interface 218 as the posts of first set of story-compositions 230 are being displayed. Interactive time display 602 may include (1) a first time entry that indicates the time "4:56 PM," a time corresponding to the first post within first set of story-compositions 230 (i.e., archived story composition 216), (2) a second time entry that indicates the time "3:00 PM," a time corresponding to the second post within first set of story-compositions 230, and (3) a third time entry that indicates the time "5:30 AM," a time corresponding to the third post within first set of story-compositions 230. In these examples, the time entry corresponding to the story-composition currently being displayed may be designated within the interactive time display (e.g., via a bolded line, a highlight, etc.).

In some embodiments, each time entry within the interactive time display may be selectable. In these embodiments, archive module 208 may (1) receive user input selecting a time entry within the interactive time display and (2) display the archived story-composition corresponding to the selected time entry, in response to receiving user input.

As described throughout the instant disclosure, the present disclosure provides systems and methods for creating and maintaining a digital story archive. In one example, a computer-implemented method may include (1) creating an archive that stores a user's story-compositions once the story-compositions have been posted to the user's digital story, (2) presenting, within an archive interface, a thumbnail of an archived story-composition being stored in the archive, (3) receiving user input selecting the thumbnail, and (4) in response to receiving the user input, displaying the archived story-composition in a full-story mode.

In one embodiment, creating the archive may include (1) receiving story-compositions from the user and posting the story-compositions to the user's digital story and (2) in addition to posting the story-compositions to the user's digital story, adding the story-compositions to the archive. In some examples the method may further include displaying, within the archive interface, a calendar view of the archive in which a digital calendar is presented. In these examples, (1) within the calendar view, the archive interface may be configured to present a thumbnail of each archived story-composition posted to the user's digital story on a particular date in response to receiving user input selecting the particular date within the digital calendar and (2) presenting the thumbnail within the archive interface may include presenting the thumbnail in response to receiving user input selecting, within the digital calendar, a date on which the archived story-composition was posted to the user's digital story.

Additionally or alternatively, the method may further include displaying, within the archive interface, a montage view of the archive in which a scrollable list of each date on which a story-composition was added to the user's digital story is presented. In such examples, (1) the archive may be configured to display, beneath each date within the scrollable list, a thumbnail of each story-composition that was posted to the user's digital story on the date and (2) presenting the thumbnail within the archive interface may include presenting the thumbnail within the scrollable list beneath a date on which the story-composition was posted to the user's digital story.

In one embodiment, displaying the archived story-composition in the full-story mode may include displaying a full-screen view of the archived story-composition and a progress bar within a full-story interface. The progress bar may include (1) a current-date section, associated with a date on which the archived story-composition was posted to the user's digital story and (2) an upcoming-date section, associated with the earliest subsequent date on which a subsequent archived story-composition was added to the user's digital story. The current-date section may be marked with a date-indicator, which indicates the date on which the archived story-composition was posted to the user's digital story, and the upcoming-date section may be marked with a subsequent date-indicator, which indicates the earliest subsequent date.

In one example, while in the full-story mode, the method may further include (1) transitioning from displaying the archived story-composition to displaying the subsequent archived story-composition and, (2) in response to displaying the subsequent archived story-composition (i) changing the date-indicator to indicate the earliest subsequent date and (ii) changing the subsequent date-indicator to indicate a next-earliest subsequent date on which a post-subsequent archived story-composition was added to the user's digital story.

In this example, (1) one or more additional story-compositions may have been posted to the user's digital story on the date on which the archived story-composition was posted to the user's digital story, (2) the full-story mode may include a default to continue to stream additional archived story-compositions in a chronological order after streaming an initial archived story-composition that is displayed in response to receiving user-input, and (3) the method may further include (i) after displaying the archived story-composition in the full-story mode, and prior to displaying the subsequent archived story-composition, automatically continuing to display the one or more additional story-compositions, one by one in a chronological order and (ii) as the full-story mode progresses through the archived story-composition and the one or more additional story-compositions, digitally filling the current-date section of the progress bar to visually convey the progression.

In some examples, the current-date section may represent a single unbroken bar and the method may include filling the current-date section by filling the current-date section at a continual speed. In one embodiment, the method may further include (1) providing, within the full-story interface, a graphic of a split-flap time display and, (2) each time the full-story interface transitions to displaying a different archived story-composition changing a time displayed by the split-flap time display to a time corresponding to the archived story-composition currently being displayed.

In one example, a corresponding system for implementing the above-described method may include an archive module, stored in memory that (1) creates an archive that stores a user's story-compositions once the story-compositions have been posted to the user's digital story, (2) presents, within an archive interface a thumbnail of an archived story-composition being stored in the archive, (3) receives user input selecting the thumbnail, and (4) in response to receiving the user input, displays the archived story-composition in a full-story mode. The system may also include a physical processor configured to execute the archive module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) create an archive that stores a user's story-compositions once the story-compositions have been posted to the user's digital story, (2) present, within an archive interface, a thumbnail of an archived story-composition being stored in the archive, (3) receive user input selecting the thumbnail, and (4) in response to receiving the user input, display the archived story-composition in a full-story mode.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   creating an archive that stores a user's story-compositions once the story-compositions have been posted to the user's digital story;
   presenting, within an archive interface, a thumbnail of an archived story-composition being stored in the archive;
   receiving user input selecting the thumbnail; and
   in response to receiving the user input, displaying the archived story-composition in a full-story mode.

2. The method of claim 1, wherein creating the archive comprises:
   receiving a plurality of story-compositions from the user and posting the story-compositions to the user's digital story; and
   in addition to posting the story-compositions to the user's digital story, adding the story-compositions to the archive.

3. The method of claim 1, further comprising displaying, within the archive interface, a calendar view of the archive in which a digital calendar is presented, wherein:
   within the calendar view, the archive interface is configured to present a thumbnail of each archived story-composition posted to the user's digital story on a particular date in response to receiving user input selecting the particular date within the digital calendar; and
   presenting the thumbnail within the archive interface comprises presenting the thumbnail in response to receiving user input selecting, within the digital calendar, a date on which the archived story-composition was posted to the user's digital story.

4. The method of claim 1, further comprising displaying, within the archive interface, a montage view of the archive in which a scrollable list of each date on which a story-composition was added to the user's digital story is presented, wherein:
   the archive is configured to display, beneath each date within the scrollable list, a thumbnail of each story-composition that was posted to the user's digital story on the date; and
   presenting the thumbnail within the archive interface comprises presenting the thumbnail within the scrollable list beneath a date on which the story-composition was posted to the user's digital story.

5. The method of claim 1, wherein:
   displaying the archived story-composition in the full-story mode comprises displaying a full-screen view of the archived story-composition and a progress bar within a full-story interface; and
   the progress bar comprises (1) a current-date section, associated with a date on which the archived story-composition was posted to the user's digital story and (2) an upcoming-date section, associated with an earliest subsequent date on which a subsequent archived story-composition was added to the user's digital story.

6. The method of claim 5, wherein:
   the current-date section is marked with a date-indicator, which indicates the date on which the archived story-composition was posted to the user's digital story; and
   the upcoming-date section is marked with a subsequent date-indicator which indicates the earliest subsequent date.

7. The method of claim 6, further comprising, while in the full-story mode:

transitioning from displaying the archived story-composition to displaying the subsequent archived story-composition; and in response to displaying the subsequent archived story-composition:

changing the date-indicator to indicate the earliest subsequent date; and changing the subsequent date-indicator to indicate a next-earliest subsequent date on which a post-subsequent archived story-composition was added to the user's digital story.

8. The method of claim 7, wherein:

one or more additional story-compositions were posted to the user's digital story on the date on which the archived story-composition was posted to the user's digital story;

the full-story mode comprises a default to continue to stream additional archived story-compositions in a chronological order after streaming an initial archived story-composition that is displayed in response to receiving user-input; and the method further comprises:

after displaying the archived story-composition in the full-story mode, and prior to displaying the subsequent archived story-composition, automatically continuing to display the one or more additional story-compositions, one by one in a chronological order; and as the full-story mode progresses through the archived story-composition and the one or more additional story-compositions, digitally filling the current-date section of the progress bar to visually convey the progression.

9. The method of claim 8, wherein:

the current-date section comprises a single unbroken bar; and filling the current-date section comprises filling the current-date section at a continual speed.

10. The method of claim 8, further comprising:

providing, within the full-story interface, a graphic of a split-flap time display; and each time the full-story interface transitions to displaying a different archived story-composition, changing a time displayed by the split-flap time display to a time corresponding to the archived story-composition currently being displayed.

11. A system comprising:

an archive module, stored in memory, that:

creates an archive that stores a user's story-compositions once the story-compositions have been posted to the user's digital story;

presents, within an archive interface, a thumbnail of an archived story-composition being stored in the archive;

receives user input selecting the thumbnail; and in response to receiving the user input, displays the archived story-composition in a full-story mode; and at least one physical processor configured to execute the archive module.

12. The system of claim 11, wherein the archive module creates the archive by:

receiving a plurality of story-compositions from the user and posting the story-compositions to the user's digital story; and in addition to posting the story-compositions to the user's digital story, adding the story-compositions to the archive.

13. The system of claim 11, wherein:

the archive module further displays, within the archive interface, a calendar view of the archive in which a digital calendar is presented;

within the calendar view the archive module is configured to present a thumbnail of each archived story-composition posted to the user's digital story on a particular date in response to receiving user input selecting the particular date within the digital calendar; and the archive module presents the thumbnail within the archive interface by presenting the thumbnail in response to receiving user input selecting, within the digital calendar, a date on which the archived story-composition was posted to the user's digital story.

14. The system of claim 11, wherein:

the archive module displays, within the archive interface, a montage view of the archive in which a scrollable list of each date on which a story-composition was added to the user's digital story is presented;

the archive module is configured to display, beneath each date within the scrollable list, a thumbnail of each story-composition that was posted to the user's digital story on the date; and the archive module presents the thumbnail within the archive interface by presenting the thumbnail within the scrollable list beneath a date on which the story-composition was posted to the user's digital story.

15. The system of claim 11, wherein:

the archive module displays the archived story-composition in the full-story mode by displaying a full-screen view of the archived story-composition and a progress bar within a full-story interlace; and the progress bar comprises (1) a current-date section, associated with a date on which the archived story-composition was posted to the user's digital story and (2) an upcoming-date section, associated with an earliest subsequent date on which a subsequent archived story-composition was added to the user's digital story.

16. The system of claim 15, wherein:

the current-date section is marked with a date-indicator, which indicates the date on which the archived story-composition was posted to the user's digital story; and the upcoming-date section is marked with a subsequent date-indicator, which indicates the earliest subsequent date.

17. The system of claim 16, wherein, while in the full-story mode, the archive module further:

transitions from displaying the archived story-composition to displaying the subsequent archived story-composition; and in response to displaying the subsequent archived story-composition:

changes the date-indicator to indicate the earliest subsequent date; and changes the subsequent date-indicator to indicate a next-earliest subsequent date on which a post-subsequent archived story-composition was added to the user's digital story.

18. The system of claim 17, wherein:

one or more additional story-compositions were posted to the user's digital story on the date on which the archived story-composition was posted to the user's digital story;

the full-story mode comprises a default to continue to stream additional archived story-compositions in a chronological order after streaming an initial archived story-composition that is displayed in response to the archive module receiving user-input;

after displaying the archived story-composition in the full-story mode, and prior to displaying the subsequent archived story-composition, the archive module automatically continues to display the one or more additional story-compositions, one by one in a chronological order; and as the full-story mode progresses through the archived story-composition and the one or more additional story-compositions, the archive module digitally fills the current-date section of the progress bar to visually convey the progression.

19. The system of claim 18, wherein:

the current-date section comprises a single unbroken bar; and the archive module fills the current-date section by filling the current-date section at a continual speed.

20. A non-transitory computer-readable medium comprising one or more computer-readable instructions that, when executed by at least one processor of a computing device, cause the computing device to:

create an archive that stores a user's story-compositions once the story-compositions have been posted to the user's digital story;

present, within an archive interface, a thumbnail of an archived story-composition being stored in the archive;

receive user input selecting the thumbnail; and in response to receiving the user input, display the archived story-composition in a full-story mode.

* * * * *